(12) United States Patent
Kilian (10) Patent No.: US 9,905,931 B2
(45) Date of Patent: Feb. 27, 2018

(54) ANTENNA FOR SHORT-RANGE APPLICATIONS AND USE OF AN ANTENNA OF THIS TYPE

(71) Applicant: Dieter Kilian, Olching (DE)

(72) Inventor: Dieter Kilian, Olching (DE)

( * ) Notice: Subject to any disclaimer, the term of this patent is extended or adjusted under 35 U.S.C. 154(b) by 59 days.

(21) Appl. No.: 14/916,746

(22) PCT Filed: Aug. 5, 2014

(86) PCT No.: PCT/EP2014/002153
§ 371 (c)(1),
(2) Date: Mar. 4, 2016

(87) PCT Pub. No.: WO2015/043700
PCT Pub. Date: Apr. 2, 2015

(65) Prior Publication Data
US 2016/0197408 A1    Jul. 7, 2016

(30) Foreign Application Priority Data
Sep. 26, 2013   (DE) .................. 10 2013 016 116

(51) Int. Cl.
*H01Q 9/30*   (2006.01)
*H01Q 1/22*   (2006.01)
(Continued)

(52) U.S. Cl.
CPC ......... *H01Q 9/30* (2013.01); *G06K 19/07773* (2013.01); *G06K 19/07788* (2013.01);
(Continued)

(58) Field of Classification Search
CPC .............. H01Q 9/30; H01Q 1/22; H01Q 9/42
(Continued)

(56) References Cited

U.S. PATENT DOCUMENTS

| 4,730,195 A | 3/1988 | Phillips et al. | |
| 5,442,368 A * | 8/1995 | Harada | H01Q 7/00 343/713 |

(Continued)

FOREIGN PATENT DOCUMENTS

| EP | 0360594 A2 | 3/1990 |
| EP | 2109059 A1 | 10/2009 |

(Continued)

OTHER PUBLICATIONS

International Search Report for PCT/EP2014/002153, dated Nov. 21, 2014, 6 pages.

(Continued)

*Primary Examiner* — Andrea Lindgren Baltzell
(74) *Attorney, Agent, or Firm* — Pearne & Gordon LLP (57) ABSTRACT

The invention relates to an antenna for short-range applications, particularly RFID applications. The antenna (1) according to the invention comprises an elongated bipolar conductor structure (12) with an inner conductor (14) and an envelope conductor (16) coaxially surrounding the same, wherein a first end (18) of the conductor structure (12) is provided as a connection end for connecting a transmitter and/or receiver for an antenna signal to be transmitted using the antenna or an antenna signal to be received by the antenna, and wherein an inner-conductor extension (24), which is connected to the inner conductor (14), is provided at a second end (22) of the conductor structure (12) and a free end (26) of the inner-conductor extension (24) is capacitively coupled to the envelope conductor (16). A wireless and reliable transmission of energy and/or information over short distances in particular can be realized using the invention.

10 Claims, 3 Drawing Sheets

(51) Int. Cl.
H01Q 9/42 (2006.01)
G06K 19/077 (2006.01)
(52) U.S. Cl.
CPC ......... H01Q 1/2208 (2013.01); H01Q 1/2216 (2013.01); H01Q 9/42 (2013.01)
(58) Field of Classification Search
USPC ......................................................... 343/793
See application file for complete search history.

(56) References Cited

U.S. PATENT DOCUMENTS

| | | | |
|---|---|---|---|
| 5,592,183 | A | 1/1997 | Henf |
| 6,842,155 | B1 | 1/2005 | Yeh |
| 8,059,045 | B1 | 11/2011 | Schaffner et al. |
| 2009/0231140 | A1 | 9/2009 | Hong et al. |
| 2010/0097275 | A1 | 4/2010 | Parsche |
| 2012/0194401 | A1 | 8/2012 | McLean et al. |
| 2013/0050042 | A1* | 2/2013 | Yoshino ............... H01Q 1/52 343/787 |

FOREIGN PATENT DOCUMENTS

| | | |
|---|---|---|
| EP | 1914662 B1 | 11/2011 |
| EP | 2571099 A1 | 3/2013 |
| JP | 02-086201 | 3/1990 |
| JP | 2003338705 A | 11/2003 |
| JP | 2011-009883 A | 1/2011 |
| WO | 2011015212 A1 | 2/2011 |

OTHER PUBLICATIONS

"Innovation in RFID: IT Rack Hardware" http://cavea-id.com/index.php/it-solution (as archived on WayBackMachine, www.archive.org). Aug. 22, 2013. 7 pages.
Ahirwar, S. D., et al, "Design and Development of Compact Corrugated Loop Antenna." 2011 Annual IEEE India Conference (INDICON). Dec. 16, 2011. Hyderabad, India, 5 pages.
Heiner, Melvin M. "Monopole Antennas." CRC Press. Apr. 22, 2003. 2 pages.
Michel, A., et al. "An Array of Meander Travelling Wave Antennas for Near-Field UHF-RFID Readers." Antennas and Propagation Society International Symposium (APSURSI), pp. 1732-1733, IEEE. Jul. 7-13, 2013. Orlando, Florida.
"Cavea Identification Introduces Innovation for IT Asset Monitoring with UHF RFID and Passive Wireless Sensing." http://news.thomasnet.com. Apr. 11, 2014. 2 pages.
Wessel, Rhea. "T-Systems, Intel Test RFID to Track Servers at Model Data Center." http://www.rfidjournal.com. Feb. 1, 2012. 2 pages.
Michel, A., et al. "Design and Performance Analysis of a Planar Antenna for Near-Field UHF-RFID Desktop Readers." Proceedings of Asia Pacific Microwave Conference (APMC). Kaohsiung, Taiwan. Dec. 4-7 2012. pp. 1019-1021.
Buffi, A., et al. "Near-Field Coupling in UHF-RFID Systems." Proceedings of 2013 International Symposium on Electromagnetic Theory. Hiroshima, Japan. May 20-24, 2013. pp. 408-411.
Ren, Ankang, et al. "A Novel Design for UHF Near-Field RFID Reader Antenna Based on Traveling Wave." 12th IEEE International Conference on Communication Technology (ICCT). Nanjing, China. Nov. 11-14, 2010. pp. 239-242.
Ren, Ankang, et al. "A Robust UHF Near-Field RFID Reader Antenna." IEEE Transactions on Antennas and Propagation, vol. 60, No. 4, Apr. 2012. pp. 1690-1697.
Yuan, Yong, et al. "UHF RFID Shelf Solution with Cascaded Reader Antenna and Positioning Capability." 2012 IEEE International Conference on RFID. Orlando, Florida. Apr. 3-5, 2012. pp. 149-156.
Medeiros, Carla R., et al. "RFID Smart Bookshelf with Confined Detection Range at UHF." Third European Conference on Antennas and Propagation. Belin, Germany. Mar. 23-27, 2009. pp. 2779-2783.
Medeiros, Carla, R., et al. "UHF RFID Smart Conveyor Belt with Confined Detection Range." IEEE Antennas and Propagation Society International Symposium. Charleston, South Carolina. Jun. 1-5, 2009. 4 pages.
Medeiros, Carla, R., et al. "RFID Smart Shelf With Confined Detection Volume at UHF." IEEE Antennas and Wireless Propagation Letters, vol. 7. 2008. 4 pages.
"Innovation in RFID" webpage, Cavea Identification GmbH. http://www.cavea-id.com/. 2012. 2 pages.
WE-AFB EMI Suppression Axial Ferrite Bead. Order No. 74270045. Wurth Elektronik. 4 pages.
Canadian Office action issued in corresponding Canadian Patent Application No. 2,923,940 dated Jan. 31, 2017, 3 pages.
Japanese Office action issued in corresponding Japanese Patent Application No. 2016-544730 dated Apr. 26, 2017, 6 pages (with translation).

* cited by examiner

ANTENNA FOR SHORT-RANGE APPLICATIONS AND USE OF AN ANTENNA OF THIS TYPE

The present invention relates to the field of high-frequency technology, particularly an antenna for short-range applications, such as RFID applications, for example. Furthermore, the invention relates to the use of such an antenna.

In the sense of the invention, the term "short-range applications" in particular comprises applications in which the transmission of electromagnetic energy and/or electromagnetic signals is provided with the use of the antenna over distances which are smaller than 5 m, in particular smaller than 1 m. However, this distance is preferably greater than 0.01 m, particularly greater than 0.05 m.

It is an object of the present invention to realise a wireless and reliable transmission of energy and/or information, particularly over short distances, in a simple manner.

This object is achieved according to a first aspect of the invention by an antenna, which comprises an elongated bipolar conductor structure with an inner conductor and an envelope conductor coaxially surrounding the same, wherein a first end of the conductor structure is provided as a connection end for connecting a transmitter and/or receiver for an antenna signal to be transmitted using the antenna or an antenna signal to be received by the antenna, and wherein an inner-conductor extension, which is connected to the inner conductor, is provided at a second end of the conductor structure and a free end of the inner-conductor extension is capacitively coupled to the envelope conductor.

Using this relatively simple design according to the invention, broadband coaxial travelling-wave antennas for short-range applications can advantageously be realised, as explained in the following.

The term "travelling wave" here relates to a preferred operating mode of the antenna in the context the invention, in which e.g. during transmission starting from the second end of the coaxial conductor structure, electromagnetic waves run back along the conductor structure in the direction towards the first end of the conductor structure.

This functionality of the antenna in transmission mode, i.e. when feeding in a high-frequency transmit signal at the connection end (first end) can be described as follows: The transmit signal applied and thus fed in at the first end of the conductor structure, between inner conductor and envelope conductor, is in principle, such as e.g. in the case of a conventional "coaxial cable", transmitted along the coaxial conductor structure to the second end thereof. The discontinuity of the conductor structure created by the second end in connection with the capacitive coupling of the inner-conductor end to the envelope conductor via the inner-conductor extension provided at this point effects the aforementioned running back of electromagnetic travelling waves as surface waves along the conductor structure (on the exterior of the envelope conductor) in the direction of the first end of the conductor structure.

For many interesting applications, it is advantageous here if the antenna builds up an electromagnetic field (travelling waves) around itself to some extent, but only radiates very little or absolutely no electromagnetic energy (by means of electromagnetic waves that "detach" themselves). An operating mode of this type is termed a "coupled mode" here.

According to an embodiment of a "coupled-mode" operating method of an antenna according to the invention, it is e.g. provided that in transmission mode, more than 50% of the energy arriving at the second end of the conductor structure due to the feeding in of the transmit signal runs as a travelling wave "bound on the conductor structure" emanating from the second end (back in the direction of the first end). In this case, less than 50% of the energy arriving at the second end is consequently radiated from the antenna as an electromagnetic wave.

Alternatively or additionally, in the "coupled-mode" operating method of an antenna according to the invention, it can e.g. be provided that in transmission mode, more than 40% of the energy fed in at the first end (connection end) of the conductor structure due to the feeding in of the transmit signal runs as a travelling wave bound on the conductor structure emanating from the second end (back in the direction of the first end).

The antenna according to the invention has an elongated conductor structure. This conductor structure can be stiff or flexible. It is also possible that both at least one stiff section and at least one flexible section are provided, of which the conductor structure is composed. The length of the elongated conductor structure can be larger than a (maximum) transverse extent (e.g. diameter) of the conductor structure e.g. by a factor in the range from 10 to 50,000.

The length of the elongated conductor structure can be e.g. at least 0.05 m, in particular at least 0.1 m. However applications in which this length is substantially larger are particularly interesting. For most applications it is satisfactory however, if this length is at most 200 m, particularly at most 100 m.

In an embodiment, it is provided that the length of the elongated conductor structure (or the length of a signal transmitter/receiver section which is further described below) is at least 2-times, particularly at least 5-times the wavelength of the travelling waves mentioned provided during operation.

In an embodiment, it is provided that the latter length at a signal frequency of up to 1 GHz provided during operation is at most 500-times, in particular at most 300-times the corresponding wavelength. For operating frequencies of more than 1 GHz, it is provided according to one embodiment that this length is at most 1,000-times, in particular at most 500-times the corresponding operational wavelength of the travelling waves.

The antenna according to the invention is preferably used with an operating frequency (carrier frequency of the antenna signal in transmission mode) in the range of 400 MHz to 6 GHz. In an embodiment, the operating frequency lies e.g. in the range from 860 to 960 MHz (as is conventional e.g. for many RFID applications). In a different embodiment, an operating frequency in the range from 1 to 3 GHz, for example 2.4 GHz, is used.

The inner conductor and the envelope conductor are electrically conductive (e.g. made from metal). In the simplest case, the inner conductor has a circular cross section and the envelope conductor has an annular cross section.

In a departure from circular cross-sectional contours, different cross-sectional contours for the inner conductor and/or the envelope conductor are also possible, for example rectangular or square or oval shapes.

The inner conductor can be formed solidly or as a hollow conductor.

The cross section of the inner conductor and/or the cross section of the envelope conductor are uniform in the simplest case, when considered over the length of the conductor structure.

As observed in the radial direction, electrical insulation or a dielectric (including e.g. air) can be arranged between inner conductor and envelope conductor. Electrical insulation (e.g. made from plastic), also termed "insulating sheath" in the following, is preferably provided radially outside of the envelope conductor, which like the inner conductor can preferably be formed from a metallic material.

The inner-conductor extension is a structure, which is electrically connected to the inner conductor at the second end of the conductor structure and is used in transmission mode of the antenna for "decoupling" energy out of the inner conductor and "coupling" this energy into the envelope conductor.

The inner-conductor extension is an electrical conductor in the simplest case, which on the one hand is connected to the inner conductor and a free end of which on the other hand preferably projects relatively close to the envelope conductor, in order to realise the capacitive coupling to the envelope conductor.

In a development it is provided that the inner-conductor extension has at least one capacitive, inductive or resistive element in the run between inner conductor and envelope conductor.

In a preferred embodiment, the inner-conductor extension runs outside of the envelope conductor at least to some extent.

In an embodiment, the inner-conductor extension has at least one angled section of the run and/or at least one curved section of the run emanating from the second end of the conductor structure up to the free end of the inner-conductor extension.

In an embodiment, the free end of the inner-conductor extension is capacitively coupled to the exterior of the envelope conductor. Alternatively or additionally, a capacitive coupling to the inside and/or the front side (at the conductor structure end) of the envelope conductor is conceivable.

In an embodiment, the inner-conductor extension is formed to be integrally connected to the inner conductor. In a different embodiment, the inner-conductor extension is formed separately from the inner conductor, but connected to the same.

In a preferred embodiment, as viewed in the longitudinal direction of the conductor structure, a surface-wave damping device is arranged at a distance from the second end of the conductor structure, for example on the outer circumference of the envelope conductor (e.g. surrounding an insulating sheath).

A surface-wave damping device of this type is advantageous insofar as the region of the "returning travelling waves" mentioned can be delimited in a well-defined manner along the conductor structure. The damping device is used to absorb the energy of arriving returning travelling waves, at least for the most part. In an embodiment, the damping device has at least one ferrite ring for this, which surrounds the outer circumference of the envelope conductor. In particular, a plurality of ferrite rings can also be arranged one behind the other in the longitudinal direction of the conductor structure, which in each case surround the outer circumference of the envelope conductor (with or without mutual spacing). In a development, the ferrite ring (or at least one of a plurality of ferrite rings) is displaceably attached on the conductor structure.

Alternatively or additionally to at least one ferrite ring surrounding the envelope conductor, the surface-wave damping device can also have a damping unit comprising a damping network (made up of capacitive and/or inductive and/or resistive elements) interposed in the run of the elongated bipolar coaxial conductor structure.

In an embodiment, the surface-wave damping device comprises an earth of the envelope conductor. An earth of this type can be implemented e.g. by means of an "earthing sleeve" attached on the outer circumference of the envelope conductor. An earthing sleeve of this type can be formed e.g. in a divided manner from two earthing-sleeve halves, which are connected to one another (e.g. screwed) for fitting.

If a surface-wave damping device is provided, then the total length of the coaxial conductor structure is therefore divided into a "signal-conducting section", located between the first end of the conductor structure and the damping device, and a "signal transmitter/receiver section", located between the damping device and the second end of the conductor structure. In a development of the invention, it is provided that one or a plurality of "discontinuities" (significant local deviations of a wave impedance effective for the travelling waves) are provided inside the signal transmitter/receiver section. Each discontinuity of this type can be implemented e.g. likewise by means of a ferrite ring as already described or a similar device. The advantage of this development consists in the fact that the propagation of the travelling waves along the conductor structure can be influenced thereby in a desired manner (for example for "wave shaping").

In the case of a relatively long antenna according to the invention, the arrangement of a surface-wave damping device may be dispensable insofar as the travelling waves running back from the second to the first conductor structure end no longer have too great an intensity, due to the unavoidable intensity loss, if the travelling waves reach the vicinity of the first end. However, in this case also, the previously mentioned discontinuities, e.g. implemented by means of ferrite rings or the like, at one or a plurality of points in the run of the antenna may be advantageous in order to influence the wave propagation in a targeted manner.

As already mentioned, a preferred use of the antenna according to the invention consists in using the same as a travelling-wave antenna in a "coupled mode". This use according to the invention can be provided e.g. for communication with transponders located in the surroundings of the antenna and/or for communication with components of a computer network located in the surroundings of the antenna.

In the "coupled-mode" operating method, communication can take place in particular not by means of electromagnetic radiation in the narrower sense, but rather by means of wave coupling with systems or units located within the antenna range. A wireless energy supply of such systems or units (e.g. sensors, particularly "intelligent sensors") can also be implemented as an alternative or in addition to wireless communication.

In a development of the invention, a "modular design" of the antenna is provided, which can be realised in particular in that one or a plurality of electrical contacts (e.g. plug and/or screw connections) are provided in the run from the first end of the conductor structure to the second end of the conductor structure (or the inner-conductor extension attached on the second end), which correspondingly delimit individual "modules", of which the antenna is composed.

In a corresponding embodiment, it is provided that a surface-wave damping device of the previously described type is equipped at one or at both of its ends with a corresponding connector device (e.g. electric plug or the like). Alternatively or additionally, a connector device of this type can in particular also be provided at the second end of the conductor structure for connecting the inner-conductor extension. The inner-conductor extension can accordingly be equipped with a (counterpart) connector device.

A major advantage of a modular design of the antenna of this type consists e.g. in it being possible to some extent to use conventional and already commercially available components such as e.g. "coaxial cables" to build the antenna, which are only to be supplemented with the respectively required additional modules for the construction according to the invention of an antenna. In particular, a conventional coaxial cable can be used in order to form the coaxial conductor structure provided according to the invention. If a surface-wave damping device is provided, this can be formed e.g. by means of a corresponding damping module, which is supplemented on both sides with conventional coaxial cables (e.g. via conventional electrical plug/screw connections), in order to realise the signal cable section on the one hand and the signal transmitter/receiver section of the antenna on the other hand by means of the two coaxial cables.

Figure 1:
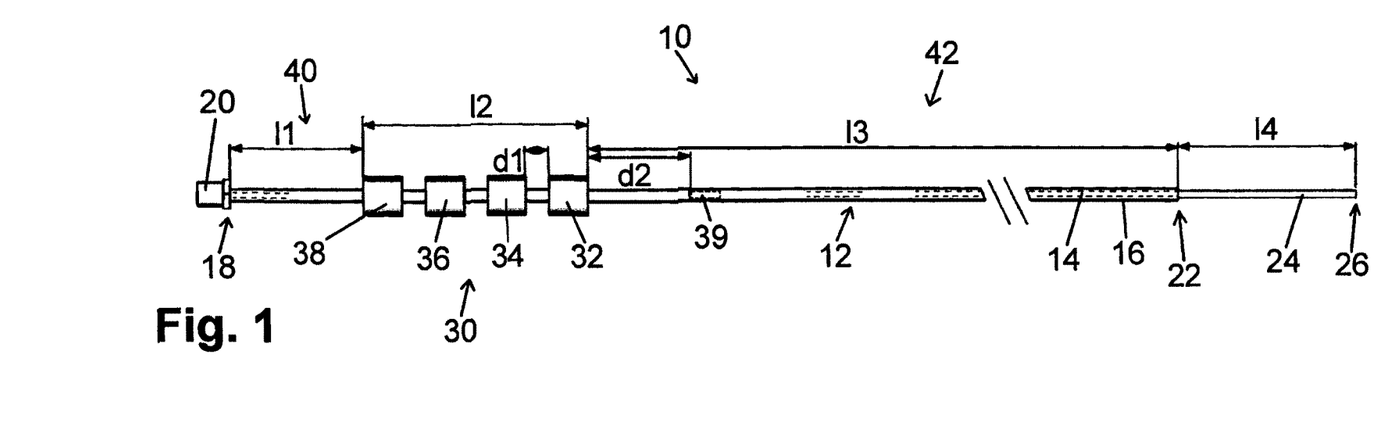
FIG. 1 shows an antenna according to a first exemplary embodiment.

The invention is described further in the following on the basis of exemplary embodiments with reference to the attached drawings. In the figures:

FIG. 1 shows an antenna 10 according to a first exemplary embodiment provided for short-range applications, particularly e.g. RFID applications.

The antenna 10 comprises an elongated bipolar coaxial conductor structure 12 with an electrically conductive inner conductor 14 and an electrically conductive envelope conductor 16 coaxially surrounding the inner conductor 14.

In the exemplary embodiment illustrated, the inner conductor 14 is cylindrical and the envelope conductor 16 is hollow and cylindrical. The inner conductor 14 like the envelope conductor 16 is e.g. in each case formed from a metallic material, wherein an electrically insulating intermediate layer (e.g. made from plastic) is expediently present radially between the inner conductor and the envelope conductor 16 over the entire length of the conductor structure 12.

A first end 18 of the conductor structure 12 (on the left in FIG. 1) is provided for connecting a transmitter and/or receiver for an antenna signal to be transmitted using the antenna 10 or an antenna signal to be received by the antenna 10, respectively, and is provided with a conventional coaxial plug 20 for this in the example illustrated, which coaxial plug realises an electrical connector for the inner conductor 14 and for the envelope conductor 16 at this first end 18 in the conventional manner for "conventional coaxial cables".

An inner-conductor extension 24, which is formed integrally with the inner conductor 14 in the example illustrated and is therefore electrically connected to the inner conductor 14, is provided at an opposite second end 22 of the conductor structure 12 (on the right in FIG. 1), which inner-conductor extension, in the example illustrated, extends out of the envelope conductor 16, starting from the second end 22 of the conductor structure 12, rectilinearly and coaxially to the run of inner conductor 14 and envelope conductor 16 directly before the second end 22. The inner-conductor extension 24 extends rectilinearly up to a free end 26 of the inner-conductor extension 24, wherein a certain capacitive coupling of the free end 26 or of the inner-conductor extension 24 to the envelope conductor 16 exists in the region of the second end 22 thereof, depending on the length of the inner-conductor extension 24.

In a transmission mode of the antenna 10, that is to say if an antenna signal to be transmitted is fed in at the coaxial plug 20 of the first end 18, then this antenna signal runs along the conductor structure 12 up to the end 22 and is reflected there more or less strongly, in order to run back as a bound travelling wave emanating from the second end 22 along the envelope conductor 16 in the direction of the first end 18.

For a correspondingly chosen operating method, for example with regards to the frequency and power of the antenna signal fed in, it can be achieved that the antenna 10 builds up an electromagnetic alternating field around itself, but radiates relatively little. Rather, it can be achieved that the antenna 10 is operated as a travelling-wave antenna in a "coupled mode", in order to therefore have good control over the (preferably relatively small) range of the antenna 10.

In the example illustrated, a surface-wave damping device 30 is arranged on the outer circumference of the envelope conductor 16, at a distance from the second end 22 (or at a point between the two ends 18 and 22) as viewed in the longitudinal direction of the conductor structure 12, which device is formed, in the example illustrated, from a plurality (here: four) of ferrite rings 32, 34, 36 and 38, which in each case surround the outer circumference of the envelope conductor. If an insulating sheath (e.g. made from plastic) is expediently provided over the entire length of the conductor structure 12 on the outer circumference of the envelope conductor 16, then the ferrite rings 32, 34, 36 and 38 surround this insulating material. The ferrite rings 32 to 38 are arranged mutually spaced from one another as viewed in the longitudinal direction of the conductor structure 12 and advantageously effect a damping of the travelling waves mentioned, which run back from the second end 22 of the conductor structure 12, when these waves arrive at the site of the damping device 30. The damping device 30 formed from the ferrite rings 32 to 38 or the arrangement location thereof in the run of the coaxial conductor structure 12 thereto fore divides the total length of the conductor structure 12 into a "signal-conducting section" 40 (on the left in FIG. 1) and a "signal transmitter/receiver section" 42, wherein during operation of the antenna 10, the section 40 is used for conducting the antenna signal emanating from or to the first end 18, and the section 42 is used for transmitting information and/or energy emanating from the antenna 10 or to the antenna 10.

The number of ferrite rings and the individual distances between the ferrite rings can be adjusted to the respective use case or the operating parameters of the antenna 10. It can also be provided that at least one ferrite ring, in the case of a plurality of ferrite rings, preferably at least the "first" ferrite ring (closest to the second end 22), that is to say the ferrite ring 32 in the example illustrated, is arranged such that it can be displaced along the conductor structure.

Therefore, the properties of the thus formed damping device can advantageously be influenced or adapted to the actual use case.

As an alternative or in addition to the ferrite rings 32 to 38, the damping device 30 can, in a departure from the example illustrated, also have different damping components, such as for example an electric network structure (made up of capacitive and/or inductive and/or resistive elements), which is arranged at the relevant point in the run of the conductor structure 12 and connected on both sides to the sections 40, 42 of the conductor structure 12 running to the first end 18 and to the second end 22.

In summary, the structure, functionality and advantages of the antenna 10 can be outlined as follows:

A main component of the antenna 10 is formed by the coaxial conductor structure 12, which can be e.g. a flexible or semi-rigid cable, or else a stiff structure, which has an "open end" or the inner-conductor extension 24 mentioned.

In the region of the inner-conductor extension 24, an envelope conductor 16 forming a shielding is removed to a certain extent in the remaining region of the conductor structure, so that a dipole antenna is created, one arm of which is formed by the open inner conductor (inner-conductor extension 24) and the other arm of which is formed by the envelope conductor 16.

The surface-wave damping device 30 formed here by one or a plurality of ferrite rings limits the effective antenna length for transmitting/receiving (section 42). In addition to an adjustment of this antenna length, the position of the damping device 30, here the position of the first ferrite ring 32 in particular, also influences the properties of the damping device 30 and therefore the properties of the returning travelling waves.

It is generally advantageous with regards to the desired generation of returning travelling waves if the inner-conductor extension 24 has a length (measured from the second end 22 of the conductor structure 12 to the free end of the inner-conductor extension 24) which at least approximately represents a quarter wavelength of the relevant antenna signal. A carrier frequency of the antenna signal may lie e.g. in the range from 500 to 5000 MHz.

The actual position of the ferrite rings 32 to 38, particularly of the first ferrite ring 32, also strongly influences the impedance of the antenna 10. In this respect, an adjustability of at least one, particularly at least the first of a plurality of ferrite rings can advantageously be used for impedance adjustment (e.g. as close as possible to 50Ω).

For a suitable geometry of the antenna 10 and a corresponding operating method, it can be achieved that the majority of a transmit signal migrates along the "signal transmitter/receiver section" 42 as a sheath current, and only comparatively little high-frequency energy is radiated ("coupled mode").

In the case of the arrangement of a plurality of ferrite rings for forming the damping device 30 in particular, there is a very effective suppression of the sheath currents on the remainder (signal-conducting section 40) of the conductor structure 12. The transition between the sections 40 and 42 is determined by the position of the damping device 30 in the run of the conductor structure 12. In this respect, it is provided according to a development that the damping device 30 is provided entirely displaceably along the conductor structure 12.

The length of the inner-conductor extension 24 can be chosen in such a manner that a desired impedance is set in combination with the position (preferably changeable position) of the first ferrite ring (here: 32) e.g. to achieve as high a return loss of the antenna 10 as possible.

The length of the antenna 10 and the lengths of the individual sections thereof mentioned can be provided such that they are adapted to the respective use case. Corresponding lengths l1 to l4 for the example of FIG. 1 are marked in FIG. 1: here, l1 is the length of the signal-conducting section 40, l2 is the length of the surface-wave damping device 30, l3 is the length of the signal transmitter/receiver section and l4 is the length of the inner-conductor extension. In the example illustrated, these lengths lie in the following ranges in each case by way of example: l1 in the range from 0.05 to 1 m, l2 in the range from 0.05 to 0.5 m, l3 in the range from 0.2 to 10 m, and l4 (preferably chosen as a quarter wavelength, depending on the wavelength) in the range from 0.03 to 0.15 m. In FIG. 1, d1 designates a distance (clear width) between the ferrite rings 32 and 34. This distance d1 lies in the range from 5 to 20 mm, for example. In a development of the invention, the envelope conductor of the coaxial conductor structure has at least one aperture. In FIG. 1, an aperture of this type is drawn in dashed by way of example and labelled with 39. The distance of the aperture 39 from the damping device 30 is labelled with d2 in FIG. 1. This distance d2 lies e.g. in the range from 1 to 5 m. In a departure from this example, a plurality of apertures of this type can also be arranged in a distributed manner over the length of the signal transmitter/receiver section 42 (with mutual spacing e.g. in the range of 0.1-times to 5-times the operational wavelength).

The ferrite rings used for forming the damping device 30, here the ferrite rings 32 to 38, should be adjusted to the transverse extent or the diameter of the conductor structure 12 (including any insulating sheath present), preferably with an annular gap between the conductor structure 12 and the inner circumference of the ferrite ring of preferably less than 3 mm. In an embodiment, the impedance of each ferrite ring at the operating frequency is greater than 100Ω. Suitable ferrite rings are commercially available, for example under the name "WE-AFB EMI Suppression Axial Ferrite Bead" from Würth Elektronik, 74638 Waldenburg, Germany.

In an advantageous embodiment of the antenna according to the invention, it is provided that the damping device has a plurality of such "discontinuities", such as e.g. ferrite rings, which differ from one another in terms of their impedance. This enables e.g. in particular a wave damping with a minimised reflected portion of the travelling waves arriving at the damping device.

In a departure from the exemplary embodiment illustrated in FIG. 1, further discontinuities or ferrite rings of the described type could be arranged in the run of the signal transmitter/receiver section 42, in order to thus realise e.g. a desired "wave shaping".

In the following description of further exemplary embodiments, the same reference numbers are used for components with the same effect, in each case supplemented by a lower-case letter for differentiating the embodiment. In this case, it is essentially only the differences from the already described exemplary embodiments that are covered and otherwise reference is hereby expressly made to the description of preceding exemplary embodiments.

Figure 2:
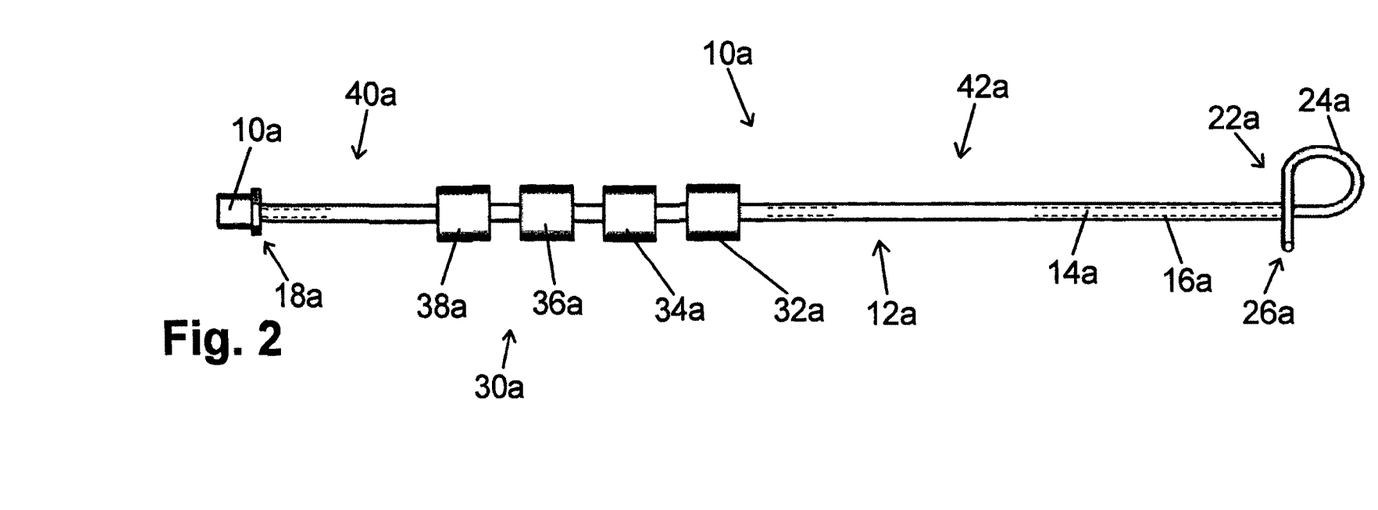
FIG. 2 shows an antenna according to a further exemplary embodiment.

FIG. 2 shows an antenna 10a according to a further exemplary embodiment.

In terms of structure and functionality, the antenna 10*a* essentially corresponds to the previously described antenna 10. However, an inner-conductor extension 24*a* is modified such that the same runs in a curved fashion in certain sections starting from a second end 22*a* of a coaxial conductor structure 12*a* to the free end 26*a* of the inner-conductor extension 24*a*. With a curvature of this type, and alternatively or additionally also at least one angling of the inner-conductor extension 24*a*, the free end 26*a* and/or the end section of the inner-conductor extension 24*a* lying directly before this free end can advantageously be brought closer to the second end 22 and therefore the end of the envelope conductor 16*a* located in this region, so that the capacitive coupling of the inner-conductor extension 24*a* to the envelope conductor 16*a* is substantially more effective than in the case of the example of the antenna 10 according to FIG. 1.

The embodiment according to FIG. 2 overcomes the disadvantage of the "basic version" according to FIG. 1, in which the impedance adjustment is rather awkward and a noticeable power emission takes place in the region of the inner-conductor extension 24. The antenna 10*a* according to FIG. 2 can be operated in such a manner that a "coupled mode" is achieved for the returning travelling waves, wherein particularly little power emission takes place in the region of the inner-conductor extension 24*a*.

It is understood that in a departure from the actual design of the inner-conductor extension 24*a* illustrated in FIG. 2, these advantages can also be achieved by means of modified runs, generally e.g. in the form of a loop, a coil, a spiral, a bow, etc.

Preferably, the free end 26*a* or an end section of the inner-conductor extension 24*a* containing this end bears directly against an insulating sheath of the conductor structure 12*a*. If the conductor structure 12*a* does not have an insulating sheath in the region of the second end 22*a*, then the free end of the inner-conductor extension 24*a* is preferably provided with insulation and bears against the (uninsulated) envelope conductor by way of the same.

An outstanding impedance adjustment (e.g. to 50Ω) can be achieved using the run of the inner-conductor extension, which is angled and/or curved at least in certain sections, as e.g. in the example according to FIG. 2, because this design acts like a combination of inductance and capacitance. Therefore, a practically loss-free impedance conversion of the feed point (first end of the conductor structure) can be achieved.

The manufacture of an antenna of the type illustrated in FIG. 2 can be implemented very easily, in that e.g. an inner-conductor extension 24*a* produced from metal and integrally connected to the inner conductor 14*a* is correspondingly deformed. In the deformed state, a permanent fixing of the inner-conductor extension 24*a* can take place e.g. using auxiliary means such as e.g. cable ties, heat-shrinkable tubing, etc.

Figure 3:
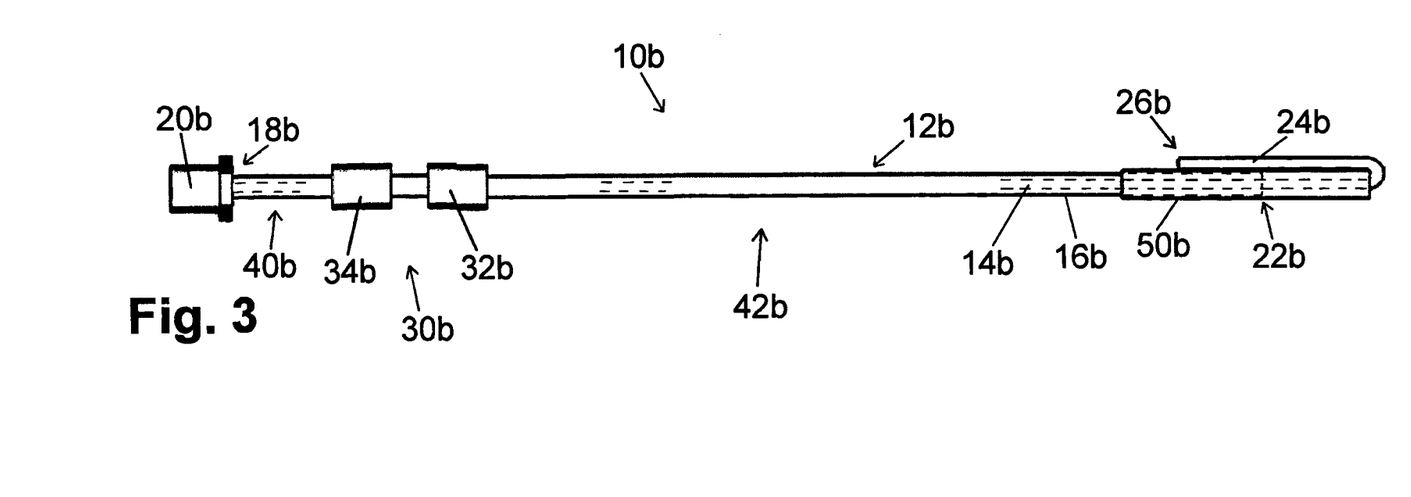
FIG. 3 shows an antenna according to a further exemplary embodiment.

FIG. 3 shows an antenna 10*b* according to a further exemplary embodiment.

In contrast with the antenna 10*a* according to FIG. 2, an inner-conductor extension 24*b* of the antenna 10*b* is bent through 180° starting from a second end 22*b* of a coaxial conductor structure 12*b* with a very small radius, in order to then run rectilinearly and at a very small distance from and parallel to the longitudinal direction of the conductor structure 12*b*. The rectilinear section of the inner-conductor extension 24*b* here preferably takes up more than 50%, in particular more than 75% of the total length of the inner-conductor extension 24*b*.

In addition, in the case of the antenna 10*b*, a spacer sheath 50*b* is provided in an end section of the conductor structure 12*b* at the second-end 22*b* side, which spacer sheath is pushed on the outer circumference of the conductor structure 12*b* or, if appropriate, on the insulating sheath thereof, at the second end 22*b*. The inner-conductor extension 24*b* is bent in such a manner here that the rectilinearly running end section bears tightly against the outer circumference of the spacer sheath 50*b*.

To manufacture an antenna of the type illustrated in FIG. 3, it is possible to proceed such that the antenna 10*b* is initially produced with an as yet un-deformed inner-conductor extension 24*b*, then e.g. a plastic tube is pushed from the second end 22*b* over the conductor structure 12*b* as spacer sheath 50*b*, and finally the portion of the inner-conductor extension 24*b* protruding out of the end of the plastic tube is bent through 180° in order to obtain the configuration illustrated in FIG. 3. The length of the conductor section finally bearing against the outer side of the plastic tube and also the overlap of the inner-conductor extension 24*b* with the envelope conductor 16*b* are set depending on the position of the plastic tube which has been pushed on and can be adjusted by means of a corresponding displacement.

An excellent impedance adjustment can be achieved and the antenna signal is very effectively coupled to the envelope conductor 16*b*. In addition, a very homogeneous operating method can be achieved in the "coupled mode".

The configuration illustrated in FIG. 3 can ultimately be fixed permanently using auxiliary means, such as e.g. a cable tie, heat-shrinkable tubing or the like.

FIG. 4 again shows the antenna 10*a* (FIG. 2) in an actual application situation.

Figure 4:
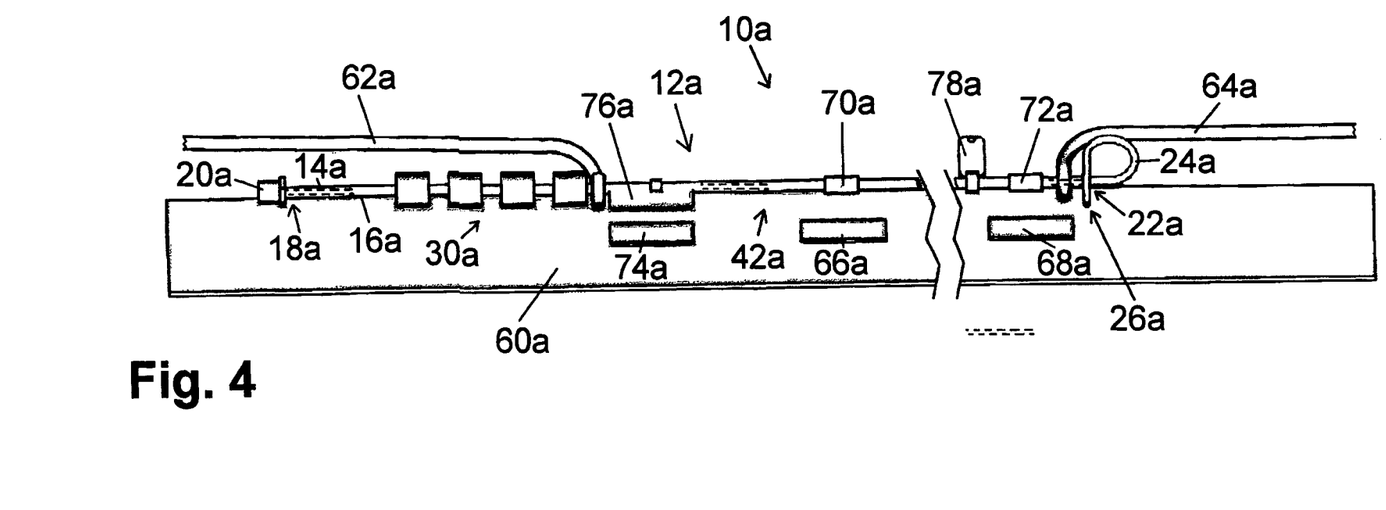
FIG. 4 shows the antenna from FIG. 2, illustrated in a particular application situation.

In this application situation, it is important that the antenna 10*a* is integrated as a communication component into a larger technical device 60*a*.

This technical device 60*a* may be e.g. a cabinet or a shelf or a different piece of furniture, particularly for storing items to be inventoried. Furthermore, it may e.g. also be parts of a building such as e.g. certain walls, braces, doors or door frames.

The antenna 10*a* can here particularly be used for communication with transponders (e.g. RFID transponders) located in the local surroundings of the antenna, wherein transponders of this type are for example provided on objects which are stored or moved (out of the technical device 60*a* or into the same) in the region of the relevant technical device 60*a*. Thus, an inventory in particular can be implemented, i.e. the detection of objects provided with transponders by means of the communication between the antenna 10*a* and the respective transponders. The preferred small range of this communication according to the invention here advantageously prevents false detections.

In the example according to FIG. 4, the antenna 10*a* is held by means of elastic bands 62 and 64, which are fastened at various points on the run of the coaxial conductor structure 12*a*. The antenna can therefore be configured to be easily removable and fastenable.

In many cases, it is interesting in the context of the invention to allow the signal transmitter/receiver section (42*a*) of the antenna provided for sending/receiving to run along a particular path on or in the relevant technical device (60*a*), wherein this path is rectilinear in the example according to FIG. 4, but quite generally can also run along more complex paths.

According to a development of the invention, means are provided for checking proper mounting or configuration of the run of the antenna. These means can, e.g. as illustrated by way of example in FIG. 4, realise an option for visually checking the mounting by means of certain markings on the antenna 10a on the one hand and on the relevant locations on the technical device 60a on the other hand.

Alternatively or additionally, these means can also e.g. comprise transponders arranged along the proper run on or in the relevant technical device 60a, so that the presence of these "path transponders" in the range of the antenna 10a can be detected by operating the antenna 10a. Thus, e.g. remote-controlled function and mounting monitoring is enabled. The transponders securely mounted in the region of the technical device 60a then function as sensors, which can be correspondingly (digitally) encoded and can only be detected in the event of correct mounting and function of the antenna 10a. The encoding can e.g. consist of a serial number, a consecutive number, position coordinates, etc. Alternatively or additionally to an identification of the path transponder (e.g. on the basis of a digital encoding), an analysis (e.g. desired-value/actual-value comparison) of the signal strength of the signal transmitted by the transponder (and received by the antenna) can also be called upon to check proper mounting or configuration of the run of the antenna, for example in order to be able to detect even relatively small changes in position.

"Path transponders" of this type for checking or monitoring the proper run of the antenna are marked by way of example in FIG. 4 and labelled with 66a and 68a.

Visually detectable markings, such as e.g. the colour markings 70a and 72a marked by way of example in FIG. 4, can also be provided at the corresponding locations in the run of the conductor structure 12a, in order to facilitate proper mounting of the antenna 10a.

Alternatively or additionally to the path transponders mentioned, the technical device 60a can also be equipped with a transponder 74a, which one could term an "antenna-type transponder", because this stores an encoding of the type of antenna to be mounted properly. After mounting the antenna 10a, this information about the "correct type" can therefore be read from the transponder 74a. Whether the antenna 10a actually installed is of the "correct type" can be determined particularly advantageously e.g. in that the antenna 10a itself is provided with a transponder 76a, which is attached thereon and therefore readable, in which transponder an encoding of the type of the antenna 10a is stored. By comparing the two read results from the transponders 74a and 76a it is therefore possible to determine whether the antenna type provided for the particular technical device 60a was actually mounted.

As an alternative or in addition to the "information storing" transponders mentioned, one or a plurality of battery-free sensors (or "transponders equipped with sensors") which are provided with electrical energy via the antenna field, can also be arranged on the antenna 10a. Thus, depending on the sensor type, it is possible in principle for any physical parameters to be detected along the antenna 10a. A "sensor transponder" of this type is marked in FIG. 4 and labelled with 78a.

As an alternative or in addition to the arrangement of such sensors directly at the antenna 10a, it is possible in particular for e.g. passive sensors (which receive their electrical supply from the antenna field) to also be arranged on or in the technical device 60a within the antenna range. Information detected using sensors of this type can also advantageously be read in a simple manner by means of communication by the antenna 10a and subsequently analysed.

Figure 5:
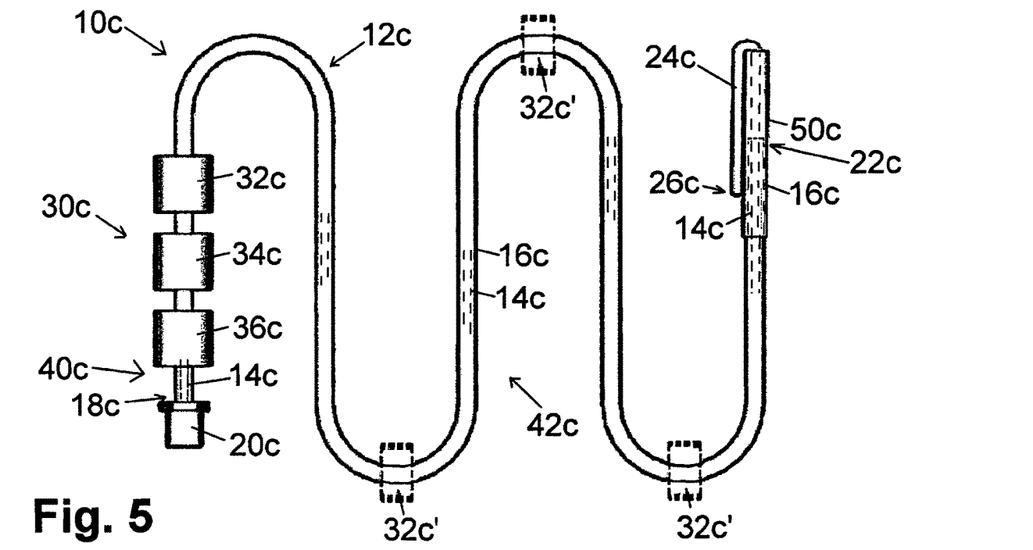
FIG. 5 shows an antenna according to a further exemplary embodiment.

FIG. 5 shows an antenna 10c according to a further exemplary embodiment.

The antenna 10c is modified compared to the antenna 10b of FIG. 3 in that the run of a signal transmitter/receiver section 42c of a coaxial conductor structure 12c is provided not rectilinearly but rather with angled and/or with curved sections of the run. In the example illustrated, the conductor structure 12c runs in a meandering fashion overall.

Such a complex run of the signal transmitter/receiver section 42c allows a targeted coverage of the region in which the communication with the antenna 10c should take place for a very small range of the antenna communication in particular. In a departure from the two-dimensional run of the antenna 10c illustrated in FIG. 5, the conductor structure 12c could also be configured to run three-dimensionally.

For complex running antennas of this type with a long length in particular, it can be provided that the antenna is composed of a plurality of sections (e.g. by means of electric plug connections). T pieces may also be used in order to realise branches in the run of the antenna. So it is possible for branching into two or more than two signal transmitter/receiver sections to be realised e.g. at the end of a signal-conducting section by means of a distributor section.

A development that can be used for all of the design variants described here is additionally shown dashed in FIG. 5, namely the arrangement of devices for "wave shaping" in the run of the antenna. These devices may be formed by ferrite rings in particular, as are marked in FIG. 5 by way of example at 32c'.

Figure 6:
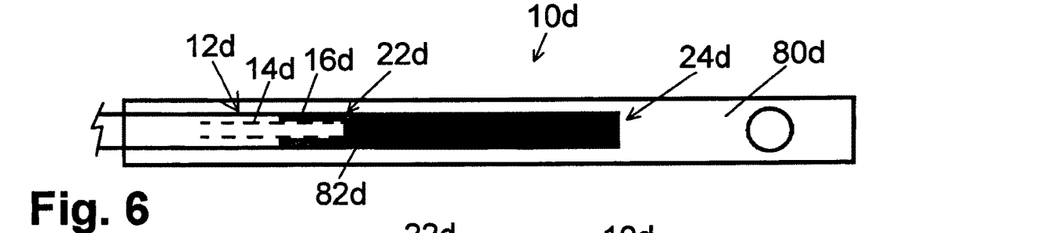
FIG. 6 shows an antenna according to a further exemplary embodiment, illustrated in a plan view.

FIG. 6 shows an antenna 10d according to a further exemplary embodiment.

By contrast with the previously described exemplary embodiments, an inner-conductor extension 24d is configured in a particular manner in the antenna 10d. For the sake of simplicity, only the surroundings in the region of a second end 22d of a coaxial conductor structure 12d are therefore shown in FIG. 6.

The modification consists in the fact that the inner-conductor extension 24d is formed separately from an inner conductor 14d. In the example illustrated, as can be seen better from the side view of FIG. 7, the inner-conductor extension 24d is formed by conductor tracks on a circuit substrate board 80d, wherein a part of the inner conductor 14d protruding out of the envelope conductor 16d at the second end of the conductor structure 12d is electrically connected via a soldered connection 82d to a first of the conductor tracks mentioned (at the top in FIG. 7). This conductor track is "through-connected" at the opposite end to a further conductor track (at the bottom in FIG. 7), which constitutes a further section of the run of the inner-conductor extension 24d and, as illustrated, by way of its free end 26d, overlaps with the end of the envelope conductor 16d in the longitudinal direction.

Figure 7:
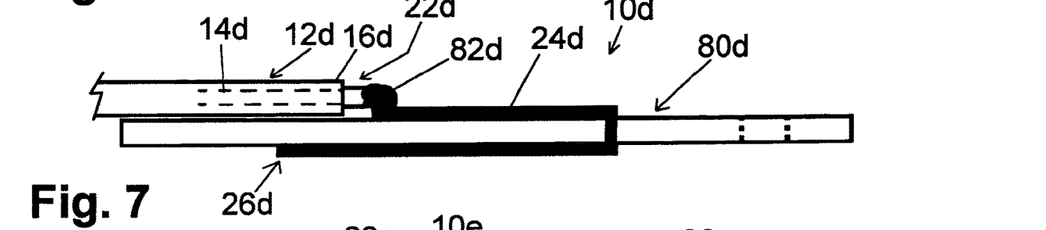
FIG. 7 shows the antenna from FIG. 6, illustrated in a schematic side view.

In terms of structure and function, the antenna 10d therefore corresponds to the previously described antenna 10b according to FIG. 3, wherein the inner-conductor extension 24d is realised by means of a separately manufactured component (circuit substrate board 80d) however, which is connected to the inner conductor 14d in the context of the manufacturing of the antenna 10d.

Figure 8:
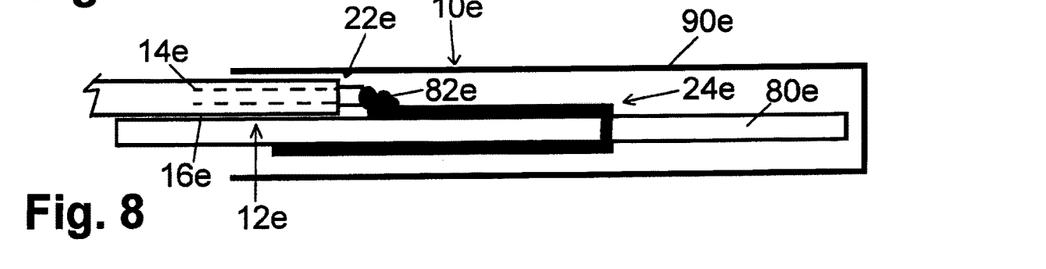
FIG. 8 shows an antenna according to a further exemplary embodiment in an illustration corresponding to FIG. 7.

FIG. 8 shows an antenna 10e according to a further exemplary embodiment, in which by contrast with the antenna 10d according to FIGS. 6 and 7, the region of the second end 22e and the inner-conductor extension 24e is shielded with a schematically drawn shielding structure 90e, in order to minimise radiation out of this region. The shielding structure 90e can, as provided for the example according to FIG. 8, e.g. have a hollow cylindrical shape closed at one end and to a certain extent be pushed and fixed (e.g. adhesively bonded) on the antenna end as a "shield pot" (e.g. made from metallic material).

In summary, antennas with e.g. the following advantages can be realised using the described exemplary embodiments:

- Essentially short ranged build-up of the electromagnetic field around the antenna, but relatively little radiation.
- Good control over the field with regards to range, field strength, reflections, line losses; no "coverage gaps" along the antenna.
- Simple tunability to a desired antenna impedance (e.g. 50Ω) in different surroundings and frequency bands.
- Antenna can be manufactured very easily, whether e.g. from flexible or from stiff coaxial cables, according to one and the same principle.
- Antenna can operate in a "coupled mode" at all frequencies provided during operation. A "radiating mode" portion can be kept low.
- It is possible at least to some extent to manufacture the antenna from structures that have other uses at the same time, particularly from solid or hollow metallic structures for forming the required envelope conductor or the inner conductor. It is only mentioned by way of example that suitable metallic structures e.g. in the case of clothes rails, white canes or mechanical struts or profile supports (e.g. of shelves, goods display stands, etc.) may be useful in the context of the invention.
- The antenna can also be operated at high transmission power and in the vicinity of metallic surfaces such that no strong reflections occur at these surfaces. Operation a few mm away from metallic surfaces is allowed.
- Robust, non-sensitive operation is possible, e.g. so that the impedance is not changed strongly even if the antenna is arranged in the vicinity of metal (e.g. good function both in an open and closed metal cabinet).
- Two-dimensional and three-dimensional antenna structures can also be formed in a simple manner (e.g. under table- or worktops, on tunnels or doors for warehouses, installation in building floors (e.g. screed, etc.))
- The antenna is simple to mount or to integrate in objects of the type mentioned (particularly e.g. cabinets, shelves or the like).

The invention claimed is:

1. An antenna for short-range applications, comprising an elongated bipolar conductor structure with an inner conductor and an envelope conductor coaxially surrounding the same, wherein a first end of the conductor structure is provided as a connection end for connecting a transmitter and/or receiver for an antenna signal to be transmitted using the antenna or an antenna signal to be received by the antenna, wherein an inner-conductor extension, which is connected to the inner conductor, is provided at a second end of the conductor structure and a free end of the inner-conductor extension is capacitively coupled to the envelope conductor, and wherein the inner-conductor extension has a 180° bend in a section thereof emanating from the second end of the conductor structure and progressing toward the free end of the inner-conductor extension, wherein the 180° bend starts from the second end, so that the free end and an end section of the inner-conductor extension lying directly before the free end and running rectilinearly and parallel to a longitudinal direction of the conductor structure lie close to the second end of the conductor structure thereby establishing said capacitive coupling in the region of the second end of the conductor structure.

2. The antenna according to claim 1, wherein the rectilinearly running end section of the inner-conductor extension takes up more than 50% of the total length of the inner-conductor extension.

3. The antenna according to claim 1, wherein the free end or the end section of the inner-conductor extension containing the free end bears by way of an insulation against the envelope conductor in the region of the second end.

4. The antenna according to claim 1, wherein the inner-conductor extension is additionally capacitively coupled to the inside and/or the front side of the envelope conductor.

5. The antenna according to claim 1, wherein the inner-conductor extension is formed to be integrally connected to the inner conductor.

6. The antenna according to claim 1, wherein the inner-conductor extension is formed separately from the inner conductor, but connected to the inner conductor.

7. The antenna according to claim 1, wherein, as viewed in the longitudinal direction of the conductor structure, a surface-wave damping device is arranged at a distance from the second end of the conductor structure.

8. The antenna according to claim 7, wherein the surface-wave damping device has at least one ferrite ring.

9. A method of using the antenna according to claim 1 as a travelling-wave antenna in a "coupled mode".

10. The method according to claim 9, further comprising communicating via said antenna with transponders located in the surroundings of the antenna and/or for communicating via said antenna with components of a computer network located in the surroundings of the antenna.

* * * * *